US011718011B2

(12) United States Patent
Boulet et al.

(10) Patent No.: US 11,718,011 B2
(45) Date of Patent: Aug. 8, 2023

(54) METHOD AND SYSTEM FOR REGULATING AN EXTRUSION PROCESS

(71) Applicant: THE ROYAL INSTITUTION FOR THE ADVANCEMENT OF LEARNING / MCGILL UNIVERSITY, Montreal (CA)

(72) Inventors: Benoit Boulet, Boucherville (CA); Raffi Toukhtarian, Bekaa (LB); Mostafa Darabi, Verdun (CA)

(73) Assignee: THE ROYAL INSTITUTION FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 496 days.

(21) Appl. No.: 16/870,161

(22) Filed: May 8, 2020

(65) Prior Publication Data
US 2020/0353663 A1 Nov. 12, 2020

Related U.S. Application Data

(60) Provisional application No. 62/846,100, filed on May 10, 2019.

(51) Int. Cl.
B29C 48/30 (2019.01)
B29C 48/92 (2019.01)
G05D 5/02 (2006.01)

(52) U.S. Cl.
CPC ............ B29C 48/30 (2019.02); B29C 48/92 (2019.02); B29C 2948/926 (2019.02);
(Continued)

(58) Field of Classification Search
CPC ....... B29C 48/92; B29C 48/325; B29C 48/30; B29C 2948/92647; B29C 2948/926; B29C 49/78
See application file for complete search history.

(56) References Cited

U.S. PATENT DOCUMENTS 5,399,302 A    3/1995 Noguchi et al.
5,718,852 A *  2/1998 Campbell ............... B29C 48/92
                                                    264/541
(Continued)

FOREIGN PATENT DOCUMENTS

CN    101138885 A  *  3/2008
CN    201179724 Y  *  1/2009

OTHER PUBLICATIONS

Yousefi et al., "A Comprehensive Experimental Study and Numerical Modeling of Parison Formation in Extrusion Blow Molding", Polymer Engineering and Science, 2007.*
(Continued)

Primary Examiner — Vincent H Tran
(74) Attorney, Agent, or Firm — Norton Rose Fulbright Canada LLP

(57) ABSTRACT

There is described a method and system for regulating an extrusion process by obtaining a first thickness at a first position along an extrudate as material is extruded through a die gap of a die; comparing the first thickness with an expected thickness of the extrudate at the first position to obtain a value for an error, the expected thickness modeled in real-time using a size of the die gap as input; and varying the size of the die gap when the error exceeds a threshold to compensate for the error. There is also described a method and system for determining an expected thickness of a material during an extrusion process.

18 Claims, 16 Drawing Sheets

(52) U.S. Cl.
CPC ............... *B29C 2948/92571* (2019.02); *B29C 2948/92647* (2019.02); *B29C 2948/92904* (2019.02); *G05D 5/02* (2013.01)

(56) References Cited

U.S. PATENT DOCUMENTS

| | | | | |
|---|---|---|---|---|
| 5,926,393 | A * | 7/1999 | Wang ...................... | B29C 48/13 700/197 |
| 6,004,489 | A * | 12/1999 | Huang ..................... | B21C 25/00 72/271 |
| 6,153,131 | A * | 11/2000 | Huang ..................... | B29C 48/09 72/271 |
| 6,190,153 | B1 * | 2/2001 | Tsuzukiyama ........ | B29C 55/143 264/40.1 |
| 6,246,918 | B1 * | 6/2001 | Wang ...................... | B29C 48/92 264/45.5 |
| 2010/0003431 | A1 * | 1/2010 | Raybuck ................. | B32B 27/06 428/116 |
| 2011/0121477 | A1 * | 5/2011 | Qiu ........................ | B28B 17/0081 264/40.7 |
| 2012/0130684 | A1 * | 5/2012 | Feng ....................... | B29C 48/07 703/1 |
| 2012/0313274 | A1 * | 12/2012 | Loukusa ................. | B29C 48/31 425/141 |
| 2014/0183796 | A1 * | 7/2014 | Huang ..................... | B29C 49/56 264/540 |
| 2016/0361857 | A1 * | 12/2016 | Reineke ................. | B29C 48/09 |

OTHER PUBLICATIONS

Lorcan Smit, "Modified Smith predictor for extruded diameter control", Apr. 1999.*

C. Elsasser, D. Eulitz and T. Kramer, The Next Generation Fuel System, Vehicle Technology Fuel Systems, 2010.

Han-Xiong Huang, Jiong-Cheng Li, and Cheng-Long Xiao. A proposed iteration optimization approach integrating backpropagation neural network with genetic algorithm. Expert Systems with Applications, 42(1):146155, 2015.

F Thibault, AM Youse, RW DiRaddo, and H Atsbha. Modeling of parison formation and process optimization for blow molded parts. In PPS-22 Conference, Yamagata, Japan, 2006.

Azizeh-Mitra Youse and Haile Atsbha. Modeling of complex parison formation in extrusion blow molding: E ect of medium to large die heads and fuel tank geometry. Polymer Engineering and Science, 49(2):229239, 2009.

Jyh-Cheng Yu, Xiang-Xian Chen, Tsung-Ren Hung, and Francis Thibault. Optimization of extrusion blow molding processes using soft computing and taguchis method. Journal of Intelligent Manufacturing, 15(5):625634, 2004.

Jyh-Cheng Yu, Zhi-Fu Liang, and Tsung-Ren Hung. Evolutionary regional network modeling for ecient engineering optimization. In Evolutionary 445 Computation (CEC),2014 IEEE Congress on, pp. 12581264. IEEE, 2014.

Thibault, Francis and Malo, Alain and Lanctot, Benoit and Diraddo, Robert, "Preform shape and operating condition optimization for the stretch blow molding process", Polymer Engineering and Science, p. 289-301 ,v 47,2007.

Yu, Jyh-Cheng, Chen, Xiang-Xian,Hung, Tsung-Ren, Thibault, and Francis,"Optimization of extrusion blow molding processes using soft computing and Taguchi's method",Journal of Intelligent Manufacturing,2004,625-634.

K. Kunisch, X. Marduel, Optimal control of non-isothermal viscoelastic fluid flow, Journal of Non-Newtonian Fluid Mechanics, vol. 88, Issue 3, 2000, pp. 261-301, ISSN 0377-0257.

C.L. Cox, H. Lee, D.C. Szurley, Optimal control of non-isothermal viscous fluid flow, Mathematical and Computer Modelling, vol. 50, Issues 78, 2009, pp. 1142-1153, ISSN 0895-7177.

Diraddo, R. W., and Andrs GarciaRejon. "Online prediction of final part dimensions in blow molding: A neural network computing approach." Polymer Engineering & Science 33.11 (1993): 653-664.

DiRaddo, R. W., W. I. Patterson, and M. R. Kamal. "Closed Loop Control of Parison Dimension Profles in Extrusion Blow Molding." International Polymer Processing 6.3 (1991): 217-224.

DiRaddo, R. W., and Andrs Garca-Rejn. "In-cycle Deterministic and Stochastic Dynamics of Extrusion Blow Molding." International Polymer Processing 7.3 (1992): 257-266.

Lee, N.C, Control Flash in Extrusion Blow Molding, Plastics Technology.

Z. Kountouriotis, G. C. Georgiou, E. Mitsoulis, On the combined effects of slip, compressibility, and inertia on the newtonian extrudate-swell flow problem, Computers and Fluids 71 (2013) 297-305.

A.-Y. Wong, J. Liang, Relationship between die swell ratio and melt flow index, Chemical Engineering Science 52 (18) (1997) 3219-3221.

G. Russo, T. Phillips, Numerical simulation of steady planar die swell for a newtonian fluid using the spectral element method, Computers & Fluids 39 (5) (2010) 780-792.

S. Claus, C. Cantwell, T. Phillips, Spectral/hp element methods for plane newtonian extrudate swell, Computers & Fluids 116 (2015) 105-117.

F. Habla, H. Marschall, O. Hinrichsen, L. Dietsche, H. Jasak, J. L. Favero, Numerical simulation of viscoelastic two-phase flows using openfoam, Chemical Engineering Science 66 (22) (2011) 5487-5496.

V. K. Konaganti, M. Ansari, E. Mitsoulis, S. G. Hatzikiriakos, Extrudate swell of a high-density polyethylene melt: ii. modeling using integral and differential constitutive equations, Journal of Non-Newtonian Fluid Mechanics 225 (2015) 94-105.

R. Toukhtarian, S. Hatzikiriakos, H. Atsbha, B. Boulet, Modeling polymer extrusion with varying die gap using arbitrary lagrangian eulerian (ale) method, Submitted to Physics of Fluids.

V. Konaganti, E. Behzadfar, R. Kwak, E. Mitsoulis, S. Hatzikiriakos, Transient swell of a high density polyethylene using adjustable gap slit die, International Polymer Processing 32 (5) (2017) 574-581.

R. Toukhtarian,M. Darabi, S. Hatzikiriakos, H. Atsbha, B. Boulet, Parameter Identification of Transport PDE/Nonlinear ODE Cascade Model for Polymer Extrusion with Varying Die Gap, It is In Progress of Submission.

N. Bekiaris-Liberis and M. Krstic, "Compensation of Transport Actuator Dynamics With Input-Dependent Moving Controlled Boundary," in IEEE Transactions on Automatic Control, vol. 63, No. 11, pp. 3889-3896, Nov. 2018.

V. K. Konaganti, M. Ansari, E. Mitsoulis, S. G. Hatzikiriakos, The effect of damping function on extrudate swell, Journal of Non-Newtonian Fluid Mechanics 236 (2016) 73-82.

M. Diagne, N. Bekiaris-Liberis, A. Otto and M. Krstic, "Control of transport PDE/nonlinear ODE cascades with state-dependent propagation speed," 2016 IEEE 55th Conference on Decision and Control (CDC), Las Vegas, NV, 2016, pp. 3125-3130.

M. Diagne and M. Krstic, "State-dependent input delay-compensated Bang-Bang control: Application to 3D printing based on screw-extruder," 2015 American Control Conference (ACC), Chicago, IL, 2015, pp. 5653-5658.

Mamadou Diagne, Nikolaos Bekiaris-Liberis, Miroslav Krstic, Compensation of input delay that depends on delayed input, Automatica,vol. 85,2017,pp. 362-373,ISSN 0005-1098.

D. Bresch-Pietri, J. Chauvin, N. Petit, Invoking Halanay inequality to conclude on closed-loop stability of a process with input-varying delay1,IFAC Proceedings Volumes,vol. 45, Issue 14,2012,pp. 266-271, ISSN 1474-6670,ISBN 9783902823045.

K. Gu and S.-I. Niculescu, Survey on recent results in the stability and control of time-delay systems, Transactions of the ASME, vol. 125, pp. 158165, Jun. 2003.

K. Gu, Y. L. Kharitonov, and J. Chen, "Stability of TimeDelay Systems", Birkhliuser. Boston: Birkhliuser, 2003.

Qing-Chang Zhong, control of dead-time systems based on a transformation, Automatica, vol. 39, Issue 2, 2003, pp. 361-366, ISSN 0005-1098.

O. J. Smith, A controller to overcome dead time, ISA J., vol. 6, No. 2, Feb. 1959, pp. 28-33.

K. Watanabe and M. Ito, A process-model control for linear systems with delay, IEEE Transactions on Automatic Control, vol. AC-26, No. 6, Dec. 1981, pp. 1261-1266.

(56) References Cited

OTHER PUBLICATIONS

Rahi Modirnia and Benoit Boulet. Application of the watanabe modified smith predictor control technique in thermoforming. In American Control Conference (ACC), 2012,pp. 64486454. IEEE, 2012.

Astrom, K. J., Hang, C. C., and Lim, B. C. (1994). A new Smith predictor for controlling a process with an integrator and long deadtime. IEEE Transactions on Automatic Control, 39(2), 343345.

W. D. Zhang, Y. X. Sun, and X. Xu, Two degree-of-freedom Smith predictor for processes with time delay, Automatica, vol. 34, No. 10, pp. 12791282, 1998.

Rezaei, Sabereh and Shahrokhi, Mohammad, Robust controller design for discrete unstable non-minimum-phase delayed stochastic processes, International Journal of Control, Automation and Systems, vol. 11, Issue 2, Oct. 2013, pp. 893-902.

A. Nicoletti and A. Karimi, "H smith predictor design for time-delayed MIMO systems via convex optimization," 2014 IEEE Conference on Control Applications (CCA), Juan Les Antibes, 2014, pp. 1418-1424.

Zhihua Qu, "Model reference robust control of weakly non-minimum phase systems," Proceedings of 32nd IEEE Conference on Decision and Control, San Antonio, TX, USA, 1993, pp. 996-1001 vol. 2. doi: 10.1109/DC.1993.325334.

M. Roozbehani and C. R. Knospe, "Robust stability and H1 performance analysis of interval-dependent time delay systems," Proceedings of the 2005, American Control Conference, 2005., Portland, OR, USA, 2005, pp. 4265-4270 vol. 6.

Y. Feng and M. Yagoubi, On state feedback h-infinity control for discretetime singular systems, IEEE Trans. Autom. Control, vol. 58, No. 10, pp. 26742679, Oct. 2013.

D. Ding, Z. Wang, B. Shen, and H. Shu, H 1 state estimation for discrete time complex networks with randomly occurring sensor saturations and randomly varying sensor delays, IEEE Trans. Neural Netw. Learn. Syst., vol. 23, No. 5, pp. 725736, May 2012.

Z. Feng, J. Lam, and H. Gao, Delay-dependent robust H 1 controller synthesis for discrete singular delay systems, Int. J. Robust Nonlinear Control, vol. 21, No. 16, pp. 18801902, 2011.

M. Chadli and M. Darouach, Novel bounded real lemma for discrete-time descriptor systems: Application H infty to control design, Automatica, vol. 48, No. 2, pp. 449453, 2012.

Z. Du, D. Yue and S. Hu, "H-Infinity Stabilization for Singular Networked Cascade Control Systems With State Delay and Disturbance," in IEEE Transactions on Industrial Informatics, vol. 10, No. 2, pp. 882-894, May 2014.

Q. Niu and Y. Liu, "H-infinity Control Theory in Vehicle Diesel Fuel Injection Pump Control System Design," 2010 International Conference on Machine Vision and Human-machine Interface, Kaifeng, 2010, pp. 98-100.

L. Vu and D. Liberzon, "Supervisory Control of Uncertain Linear Time-Varying Systems," in IEEE Transactions on Automatic Control, vol. 56, No. 1, pp. 27-42, Jan. 2011.

S. Boyd, V. Balakrishnan, P. Kabamba, A bisection method for computing the H norm of a transfer function andrelatedproblems, Math. Control Signals Systems 2 (1989) 207219.

T. Liu, Q.-G. Wang, H.-P. Huang, A tutorial review on process identification from step or relay feedback test, Journal of Process control 23(10)(2013) 1597-1623.

S. Saxena, Y. V. Hote, Load frequency control in power systems via internal model control scheme and model-order reduction, IEEE Transactions on 600 Power Systems 28 (3)(2013) 2749-2757.

T. Liu, F. Gao, Closed-loop step response identification of integrating and unstable processes, Chemical Engineering Science 65 (10) (2010) 2884-2895.

G. Rangaiah, P. Krishnaswamy, Estimating second-order dead time parameters from underdamped process transients, Chemical Engineering Science 51 (7) (1996) 1149-1155.

P. Balaguer, V. Alfaro, O. Arrieta, Second order inverse response process identification from transient step response, ISA transactions 50 (2) (2011)231-238.

K. Narendra and P. Gallman, "An iterative method for the identification of nonlinear systems using a Hammerstein model," in IEEE Transactions on Automatic Control, vol. 11, No. 3, pp. 546-550, Jul. 1966.

Piroddi L, Farina M, Lovera M (2012) Black box model identification of nonlinear inputoutput models: a WienerHammerstein benchmark. Control Eng Pract 20(11):11091118.

Takagi T, Sugeno M (1985) Fuzzy identification of systems and its applications to modeling and control. IEEE Trans Syst Man Cybern SMC 15:116132.

Hunter I W and Korenberg M J 1986 "The identification of nonlinear biological systems: Wiener and Hammerstein cascade models" Biol. Cybern. 55 13544.

Bibel, John E., and D. Stephen Malyevac. Guidelines for the selection of weighting functions for H-innity control. No. NSWCDD/MP-92/43. Naval Surface Warfare Center Dahlgren Div VA, 1992.

J.-C. Yu, and F. Thibault. Optimization of Extrusion Blow Molding Processes using Soft Computing and Taguchi's Method. NRC Publications Archive (NPArC). Journal of Intelligence Manufacturing, 15, 5, pp. 625-634, Feb. 1, 2004.

C. B. Brosilow. "The structure and design of Smith predictors from the viewpoint of inferential control." In Proceedings of Joint American Control Conference, Denver, Colorado, 1979. (Abstract only).

\* cited by examiner

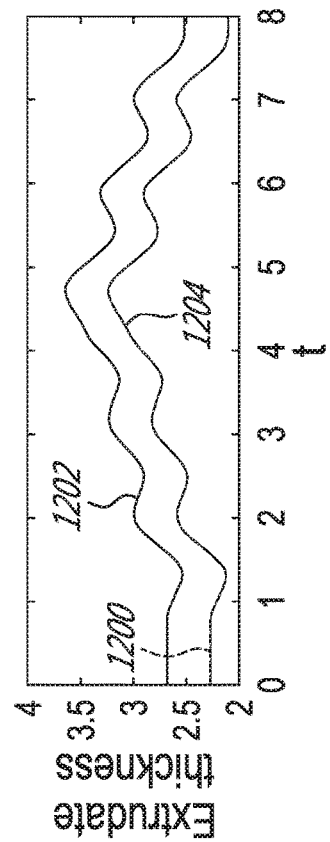
FIG. 12B
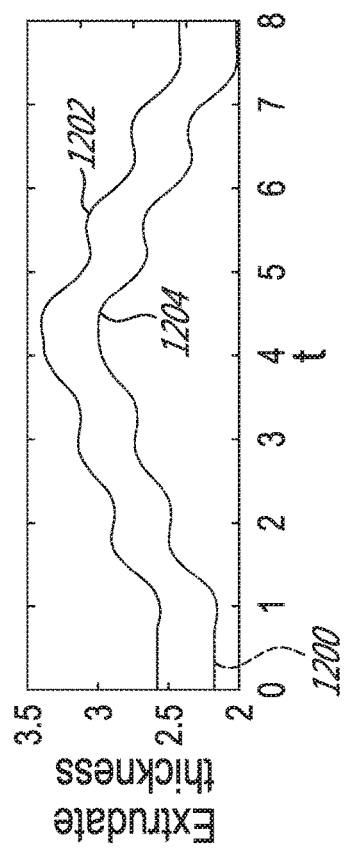
FIG. 12A
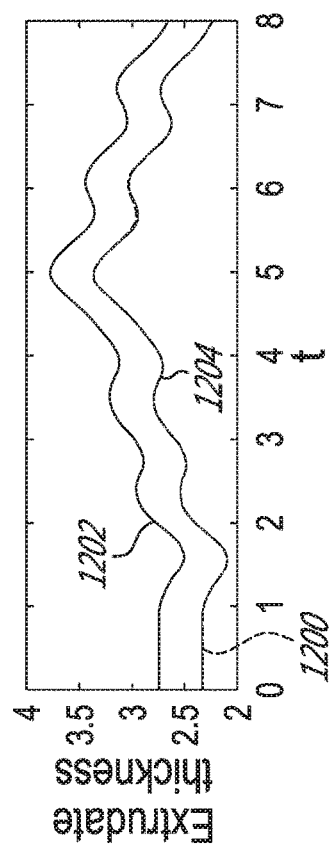
FIG. 12D
FIG. 12C
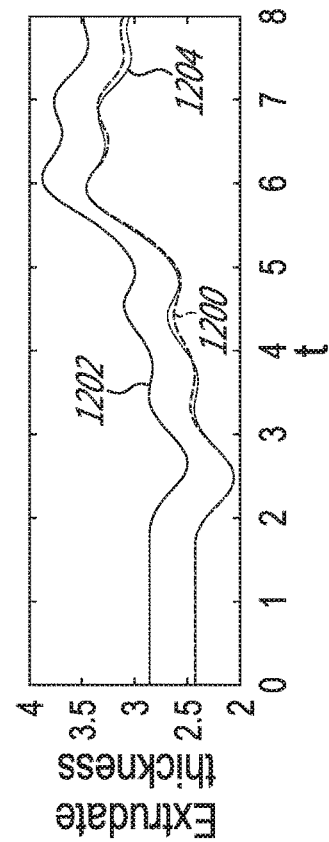
FIG. 12F
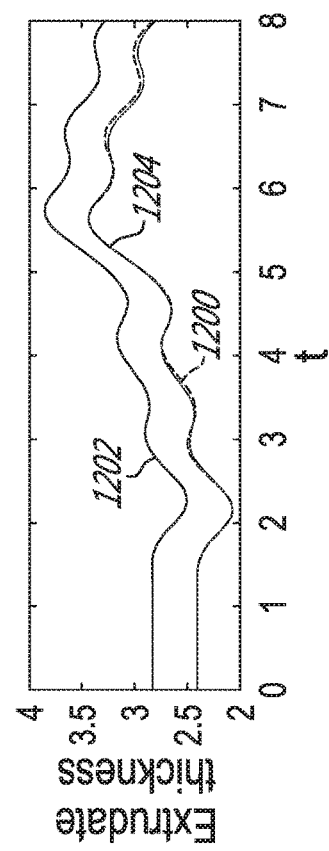
FIG. 12E

METHOD AND SYSTEM FOR REGULATING AN EXTRUSION PROCESS

CROSS-REFERENCE TO RELATED APPLICATIONS

The present application claims the benefit of U.S. Provisional Patent Application No. 62/846,100 filed on May 10, 2019, the contents of which are hereby incorporated by reference.

TECHNICAL FIELD

The present disclosure relates generally to Extrusion Blow Molding (EBM), a plastic forming technique. More specifically, the present disclosure relates to simulating extrudate thickness for varying die gap extruders.

BACKGROUND OF THE ART

Extrusion Blow Molding (EBM) is a plastic forming technique used to manufacture hollow parts. EBM is used to produce a wide range of products such as sail boats, toys, bumpers, and different types of containers.

One advantage of EBM over other molding techniques such as injection blow molding is the ability to manufacture larger parts with low tooling cost. One drawback of EBM is the limited control over the final product's thickness.

To adjust the manufactured part thickness distribution, the die opening is varied during extrusion. The time needed for the extrusion process (extrusion cycle) is divided into equal intervals in which the die gap is set to a constant value called a set point. The task of tuning the set points in order to obtain the desired thickness profile of the molded part is known as die gap programming.

Die gap programming is a very demanding task usually done by trial and error. In addition to being time consuming, die gap programming is expensive due to the large number of scrapped parts generated using trial and error.

Therefore, there is room for improvement.

SUMMARY

In accordance with a first broad aspect, there is provided a method for regulating an extrusion process. The method comprises obtaining a first thickness at a first position along an extrudate as material is extruded through a die gap of a die; comparing the first thickness with an expected thickness of the extrudate at the first position to obtain a value for an error, the expected thickness modeled in real-time using a size of the die gap as input; and varying the size of the die gap when the error exceeds a threshold to compensate for the error.

In accordance with another broad aspect, there is provided a method for determining an expected thickness of a material during an extrusion process. The method comprises obtaining a size of a die gap at a time T and a first position away from the die gap along an extrudate as material is extruded through the die gap; modeling a material transport delay from the die gap to the first position for the size of the die gap; determining a steady state thickness of the extrudate at the first position taking into account the material transport delay; replicating a change in the steady state thickness with respect to time to determine the expected thickness at the first position at time T; and outputting the expecting thickness of the material.

In accordance with yet another broad aspect, there is provided a system for regulating an extrusion process, the system comprising at least one processing unit and a non-transitory computer readable medium having stored thereon program instructions. The program instructions are executable by the at least one processing unit for obtaining a first thickness at a first position along an extrudate as material is extruded through a die gap of a die; comparing the first thickness with an expected thickness of the extrudate at the first position to obtain a value for an error, the expected thickness modeled in real-time using a size of the die gap as input; and varying the size of the die gap when the error exceeds a threshold to compensate for the error.

In accordance with another broad aspect, there is provided a system for determining an expected thickness of a material during an extrusion process, the system comprising at least one processing unit and a non-transitory computer readable medium having stored thereon program instructions. The program instructions are executable by the at least one processing unit for obtaining a size of a die gap at a time T and a first position away from the die gap along an extrudate as material is extruded through the die gap; modeling a material transport delay from the die gap to the first position for the size of the die gap; determining a steady state thickness of the extrudate at the first position taking into account the material transport delay; replicating a change in the steady state thickness with respect to time to determine the expected thickness at the first position at time T; and outputting the expecting thickness of the material.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 12A-12F illustrate example sensor readings in various settings, in accordance with some embodiments;

It will be noted that throughout the appended drawings, like features are identified by like reference numerals.

DETAILED DESCRIPTION

There is described herein a computer model that provides a simulation tool to predict extrudate thickness for an extrusion process. The computer model may be used in a feedback system that prevents machine drift and ensures consistent extrudate thickness during the extrusion process. The extrusion process may be physical or virtual. A physical extrusion process may be used in any manufacturing or other industrial setting. A virtual extrusion process may be used for simulations, teaching, gaming, and other applications suitable for a virtual environment. Accordingly, a method and system for determining an expected thickness of a material during an extrusion process are described herein. Also described are a method and system for regulating an extrusion process, using the expected thickness as modeled in real-time.

Figure 1:
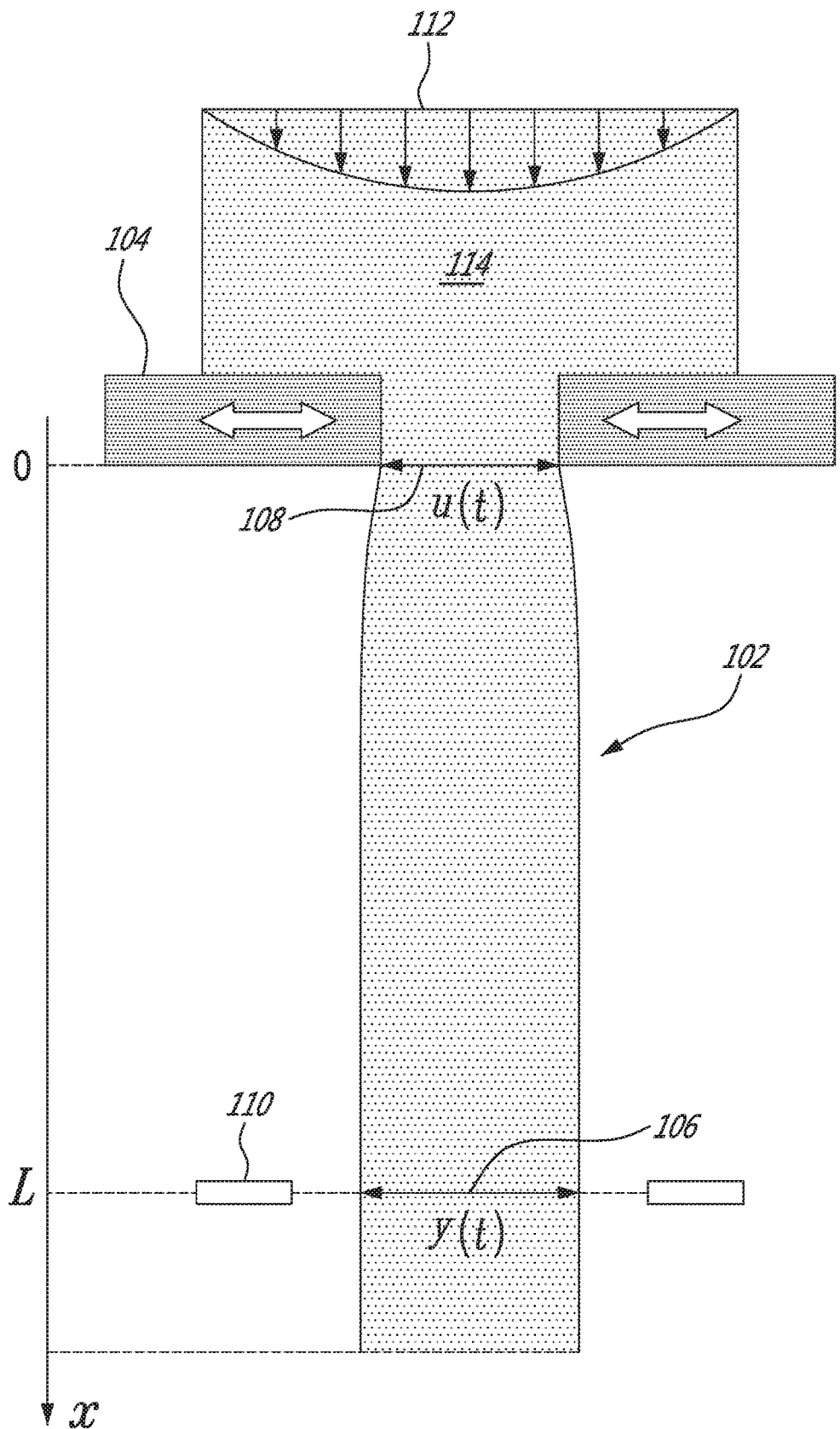
FIG. 1 is a schematic showing an extruder extruding and the extrudate, in accordance with some embodiments.

With reference to FIG. 1, during extrusion, fluid material such as molten polymer is forced into a barrel 114 through an inlet 112 and extruded out of a die 104, forming a vertically suspended extrudate 102. The fluid material expands dynamically as it exits the die 104. In solid extrusion, the extrudate does not change shape once the material leaves the die. Therefore, the material velocity is uniform along the extrudate. However, during fluid extrusion, the extrudate 102 changes shape as it is being extruded. Therefore, particles on the extrudate 102 do not have uniform velocity.

Different types of dies produce different extrudate shapes. Slit dies produce sheet-shaped extrudates while annular dies produce cylindrical extrudates. FIG. 1 shows a cross section of a sheet-shaped extrudate 102 as produced by a slit die 104. While the examples used herein refer to slit dies, the methods and systems are applicable to annular dies as well.

A computer model is developed to predict the thickness 106 of the extrudate 102 for a given set of set points (i.e. die gap parameters). The die gap 108 changes with time from one set point to another, altering the extrudate 102 thickness. The input of the model is the die gap signal u(t) and the output is the thickness signal y(t) at a location (x=L). In FIG. 1, an example thickness y(t) is measured at position x=L using a sensor 110.

The computer model may be derived by minimizing an error between a step response of the model and a step response of a reference system. The reference system may be another simulator or a real setup. The parameters of the model are determined such that the response of the model replicates the response of the reference system. In some embodiments, the reference model is simulated using a Finite Element Method (FEM), such as the one described in Toukhtarian, Raffi et al, "Modeling polymer extrusion with varying die gap using Arbitrary Lagrangian Eulerian (ALE) method", Physics of Fluids (2018), Volume 30, Issue 9, the contents of which are hereby incorporated by reference.

Figure 2:
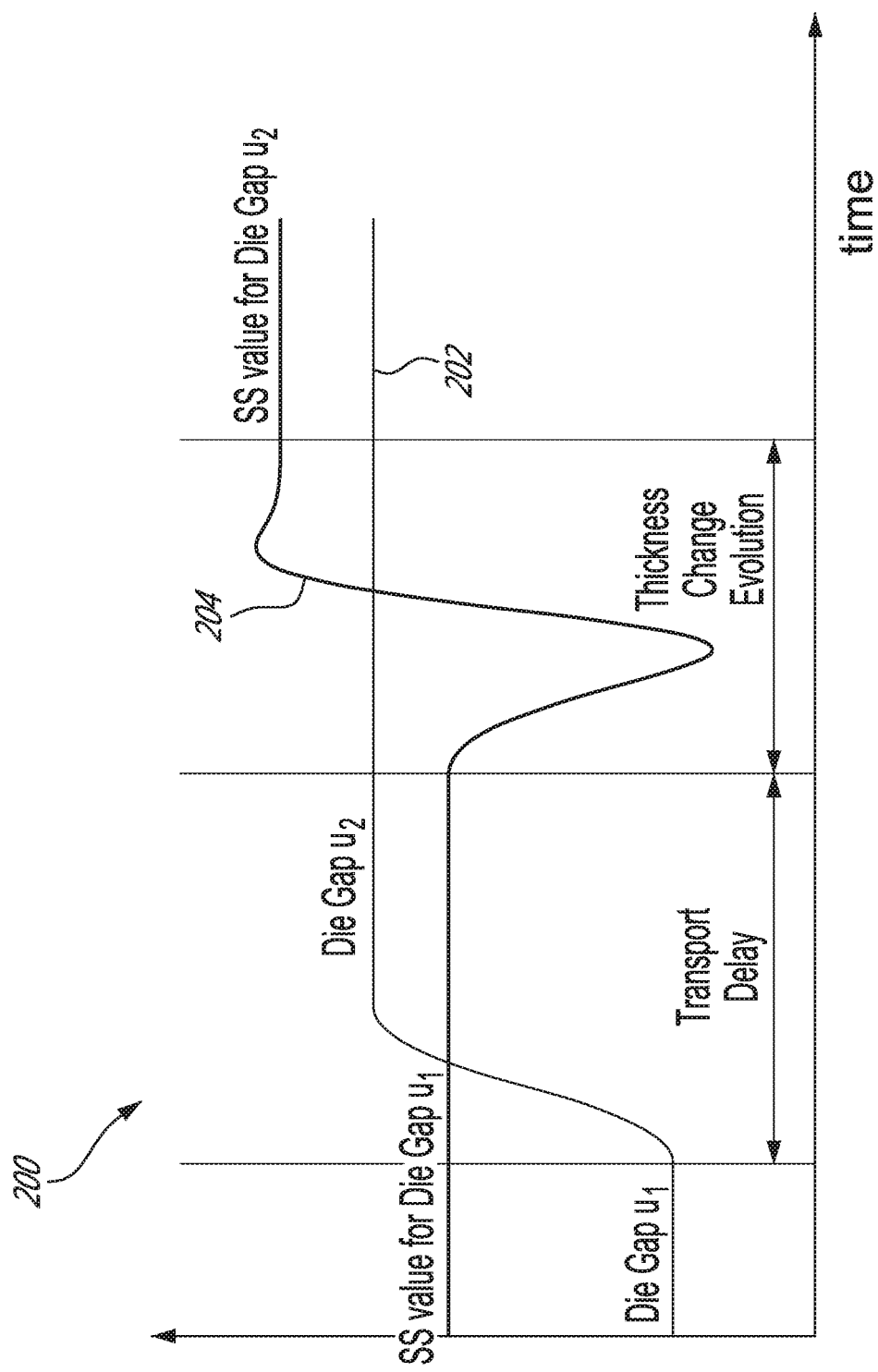
FIG. 2 shows a graph of an example thickness variation due to a step change in die gap, in accordance with some embodiments.

FIG. 2 shows an example thickness variation with respect to time at a distance away from the die due to a step-like die gap change. In this example, the die gap changes from $u_1$ to $u_2$ as illustrated by curve 202. When the die gap remains constant for a certain time, the thickness attains a steady state value as illustrated by curve 204. Therefore, the thickness changes from a first steady state value due to $u_1$ to a second steady state value due to $u_2$. The transient change in between the two steady state values shows a delay before the change in thickness starts to occur. This is mainly due to the material transport from the die to the location of the output. After the transport delay, the thickness changes with respect to time in a manner that is dependent on the extruder setup.

Figure 3:
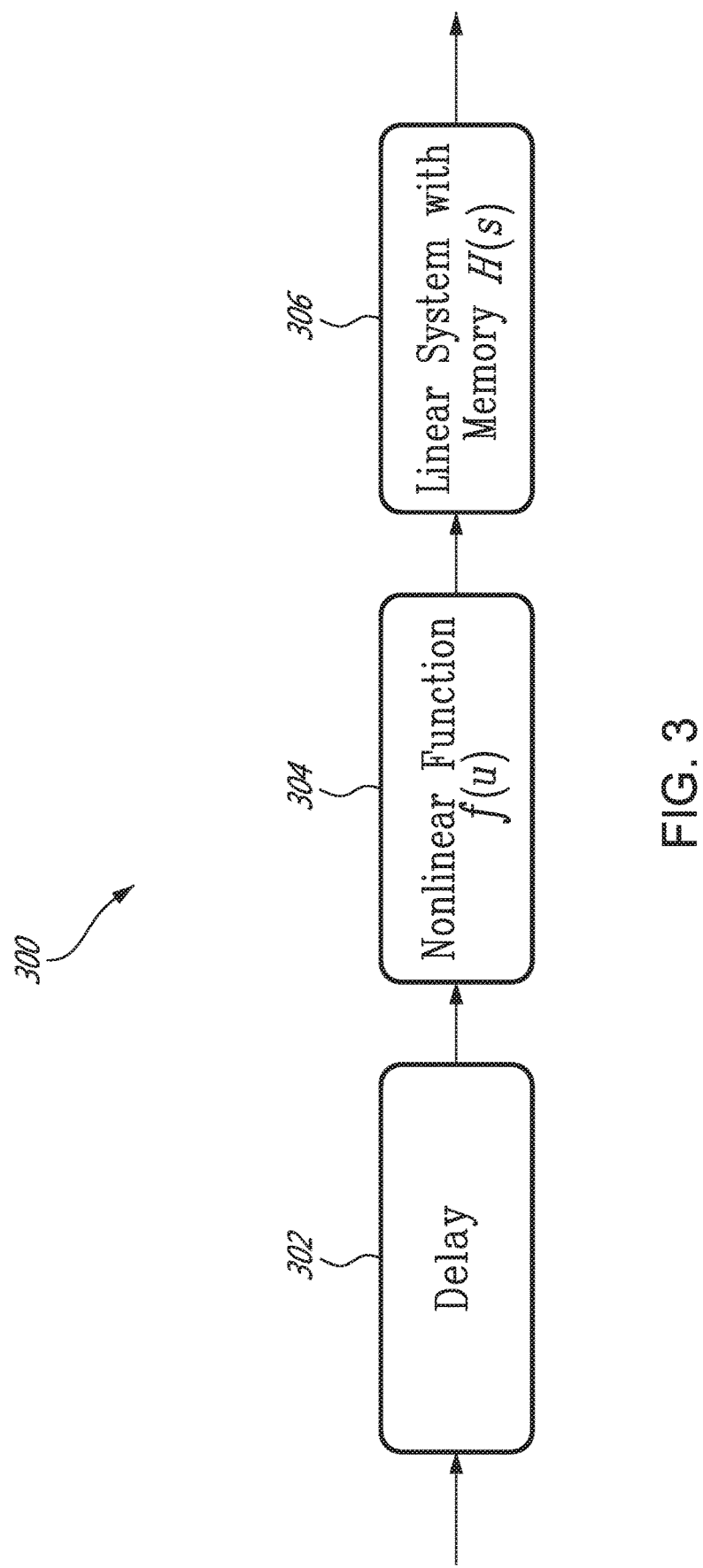
FIG. 3 is a block diagram of a computer model at a location on the extrudate, in accordance with some embodiments.

Referring to FIG. 3, there is illustrated a block diagram of the computer model 300 as composed of three main blocks that replicate the step response shown in FIG. 2, namely a delay 302, a nonlinear function f(u) 304, and a linear system with memory 306 represented by a transfer function H(s). In some embodiments, the computer model uses a Hammerstein model with delay to replicate the extrudate thickness at a certain distance from the die, based on the delay 302, the nonlinear function 304, and the linear system 306.

The delay 302 models the material transport delay, i.e. the time it takes for the material to travel from the die to a location x=L away from the die. A constant die gap value u is received as input, and a delayed die gap $u_d(t,x)$ is output and provided to the nonlinear function 304. The nonlinear function 304 determines a steady state thickness value for the delayed die gap value at the location x=L and outputs the steady state thickness value to the linear system 306. A transfer function H(s) replicates a change of the steady state thickness value with respect to time and outputs the expected thickness of the material at the location x=L for the constant die gap value.

Figure 4:
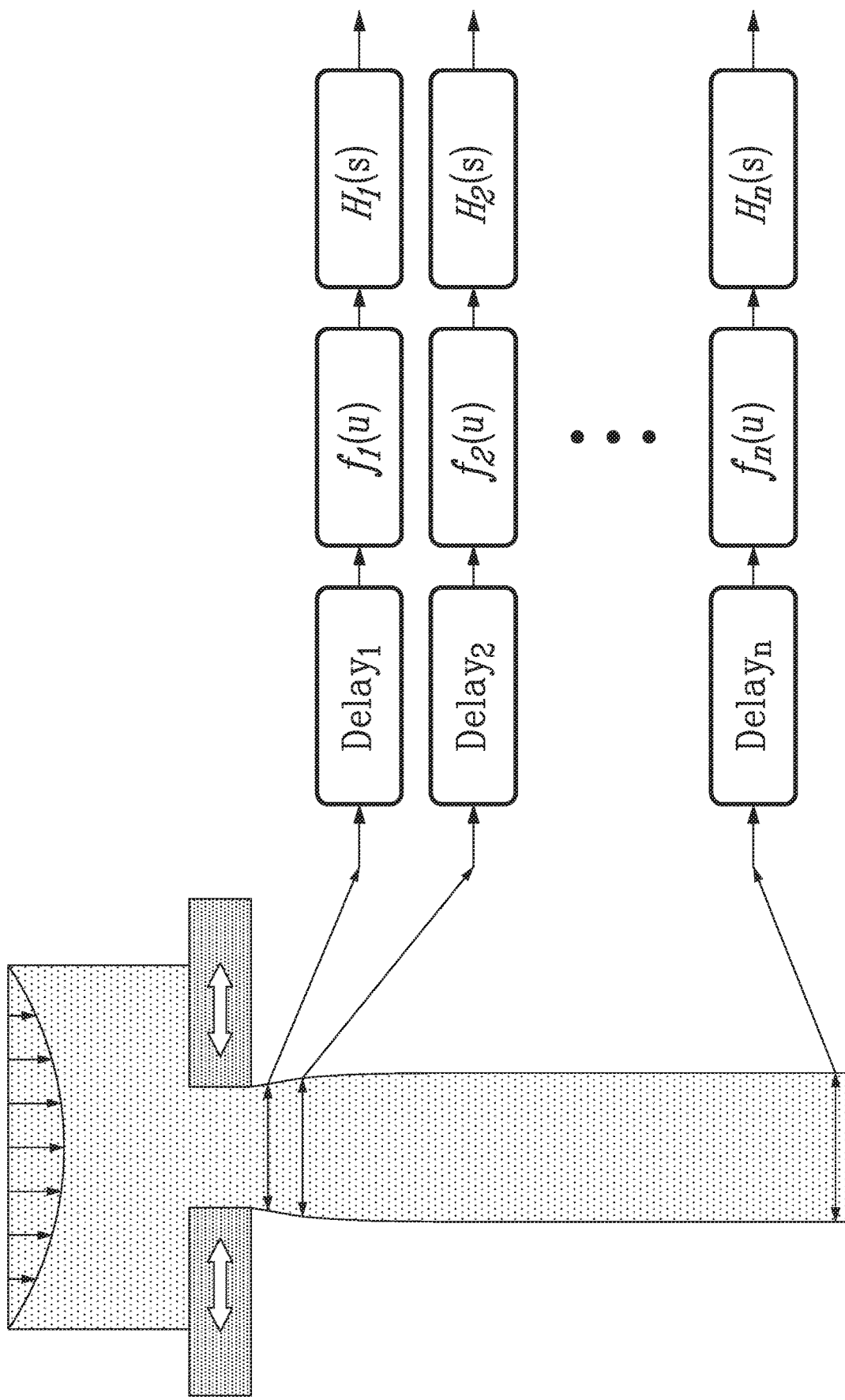
FIG. 4 illustrates the computer model of FIG. 3 applied to the entire extrudate, in accordance with some embodiments.

To simulate the overall shape of the extrudate, a finite number (n) of positions x are chosen for the model, as shown in FIG. 4. The delayed input $u_d(t,x)$ at different positions x and instants t is calculated by solving a transport Partial Differential Equation (PDE) shown below.

$$\frac{\partial u_d(t,x)}{\partial t} = v(t,x) \frac{\partial u_d(t,x)}{\partial x}$$

The boundary condition of the PDE at x=0 is $u_d(t,0)=u(t)$ and the initial condition is $u_d(0,x)=u(0)$. The initial condition is derived by assuming that the die gap has been constant before t=0.

The transport material velocity v(t,x) is dependent on the die gap and position x as shown in the equation below.

$$v(t,x) = \beta f_v(x) \frac{Q_0 - L_D \frac{\partial u(t)}{\partial t}}{u(t)}$$

$Q_0$ is the volumetric flow rate at the inlet 112 shown in FIG. 1. $L_D$ is the length of the die, and $f_v(x)$ is a position-dependent second order polynomial. The parameters of $f_v(x)$ and $\beta$ are estimated by using a parameter identification technique. In some embodiments, the parameter identification technique is based on minimizing an integral of a step response error between a low order model and a finite element model. Other methods for identifying the parameters may also be used.

Figure 5:
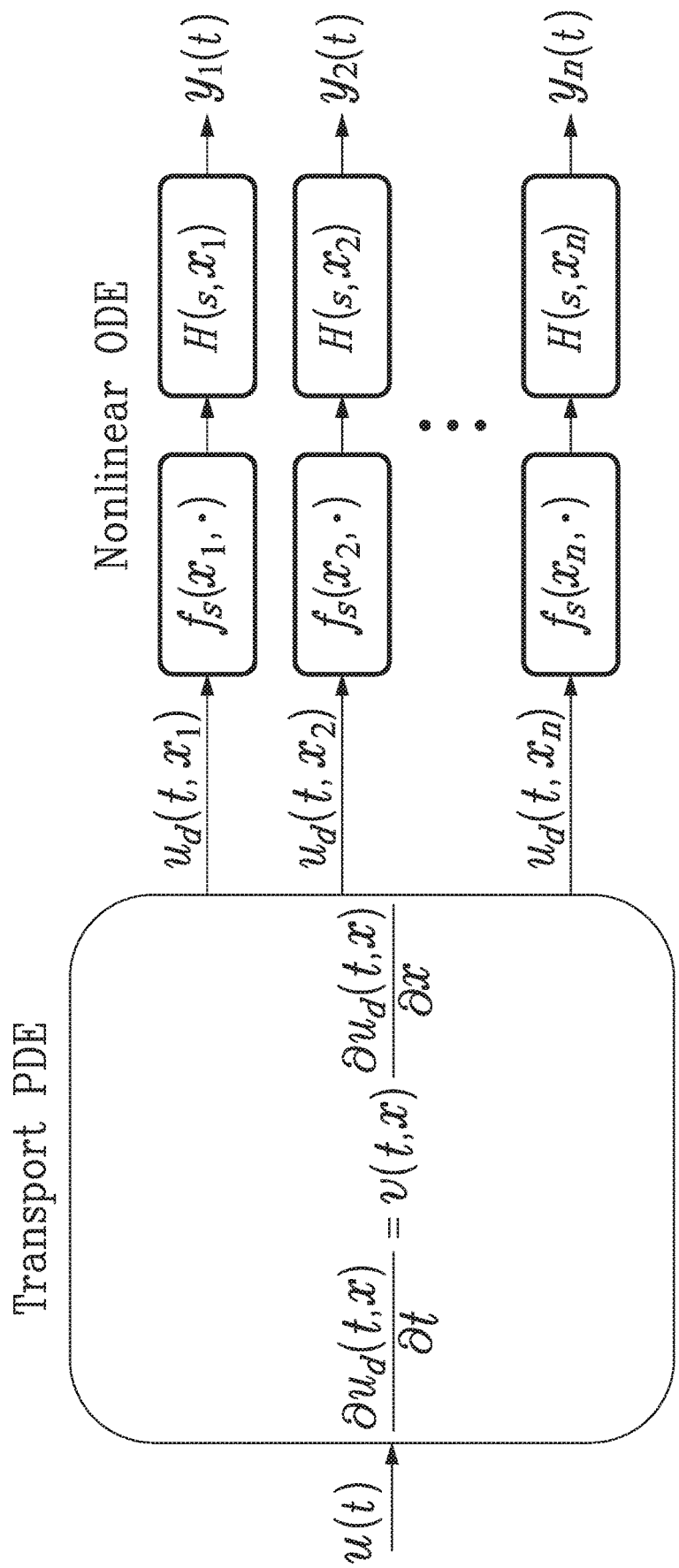
FIG. 5 illustrates the computer model of FIG. 3 mathematically, in accordance with some embodiments.

An example embodiment of the computer model is shown mathematically in FIG. 5. The combination of the nonlinear function and the transfer function, also known as a Hammerstein model, is represented as a nonlinear Ordinary Differential Equation (ODE). The example embodiment thus has a transport PDE/nonlinear ODE cascade structure.

In some embodiments, the linear system 306 has non-minimum phase dynamics and a unity DC gain. The non-minimum phase dynamics recreate the necking and bulging effects of the extrusion process. Given that the linear system has a unity DC gain, the steady state value of the extrudate is determined by $f_s(x, u)$.

Figure 6:
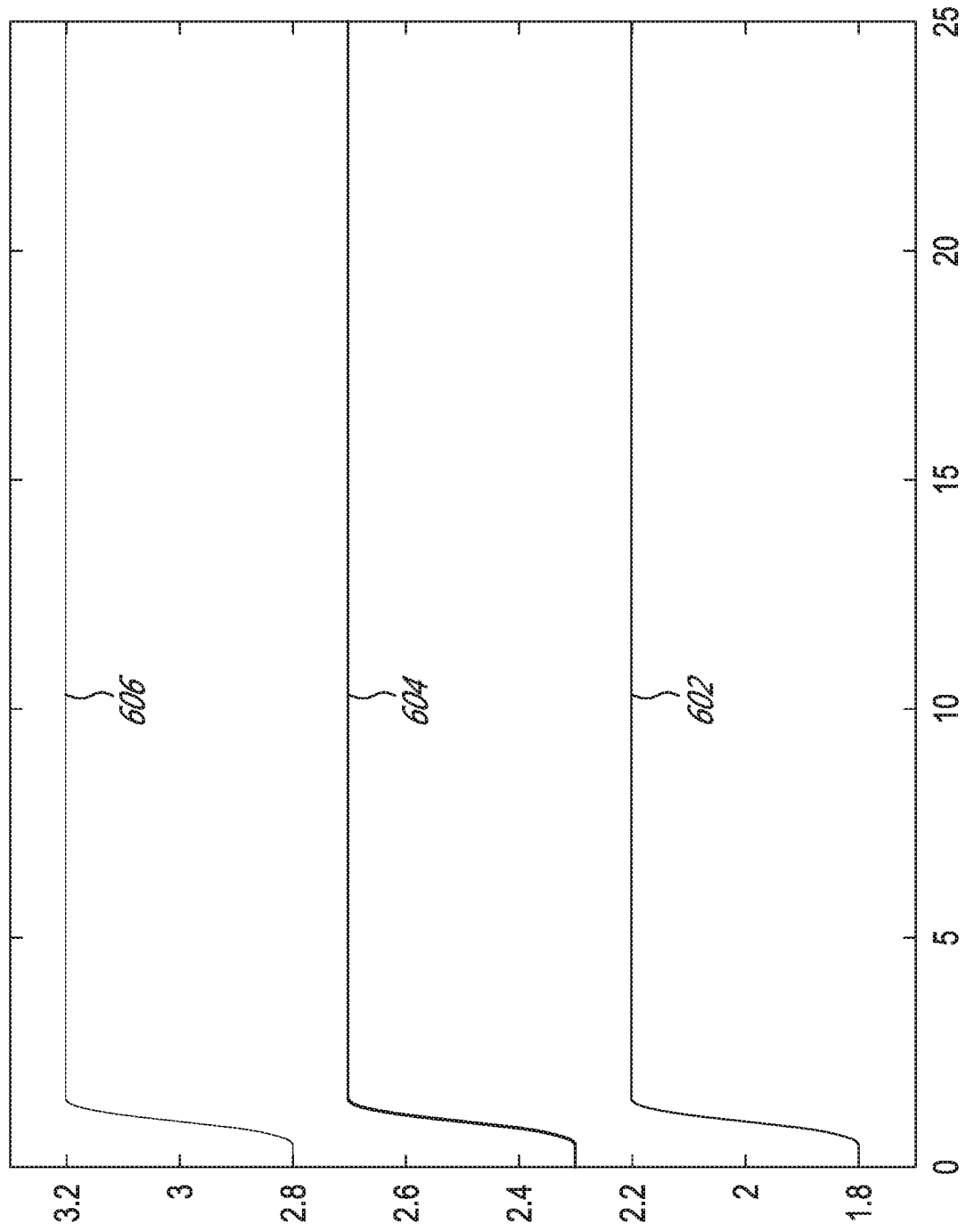
FIG. 6 illustrates example inputs $u_1(t)$, $u_2(t)$ and $u_3(t)$, in accordance with some embodiments.

FIG. 6 illustrates three example inputs $u_1(t)$ (curve 602), $u_2(t)$ (curve 604), $u_3(t)$ (curve 606) for the computer model, representing the die gap variation with respect to time. The values of $u_1(t)$, $u_2(t)$, $u_3(t)$ change from 1.8 to 2.2, 2.3 to 2.7, and 2.8 to 3.2 respectively during a period $\Delta T=1$. The die gap increases with a constant second derivative of value a for the first half of $\Delta T$ and then increases with a constant second derivative of value $-a$ for the second half.

Figure 7A:
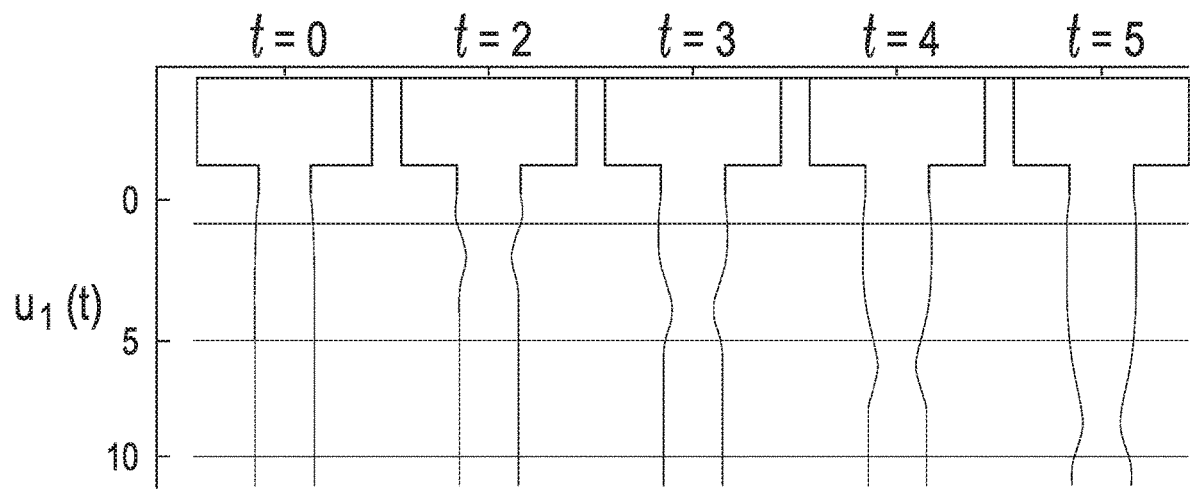
FIGS. 7A-7C illustrate example extrudate shapes for $u_1(t)$, $u_2(t)$ and $u_3(t)$ at different instances of time, in accordance with some embodiments.
Figure 7B:
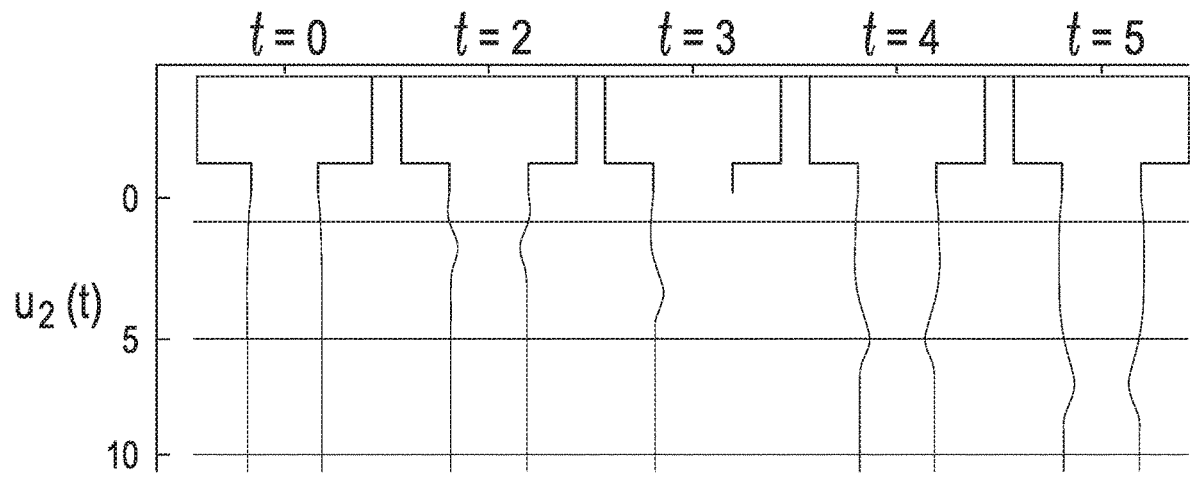
Figure 7C:
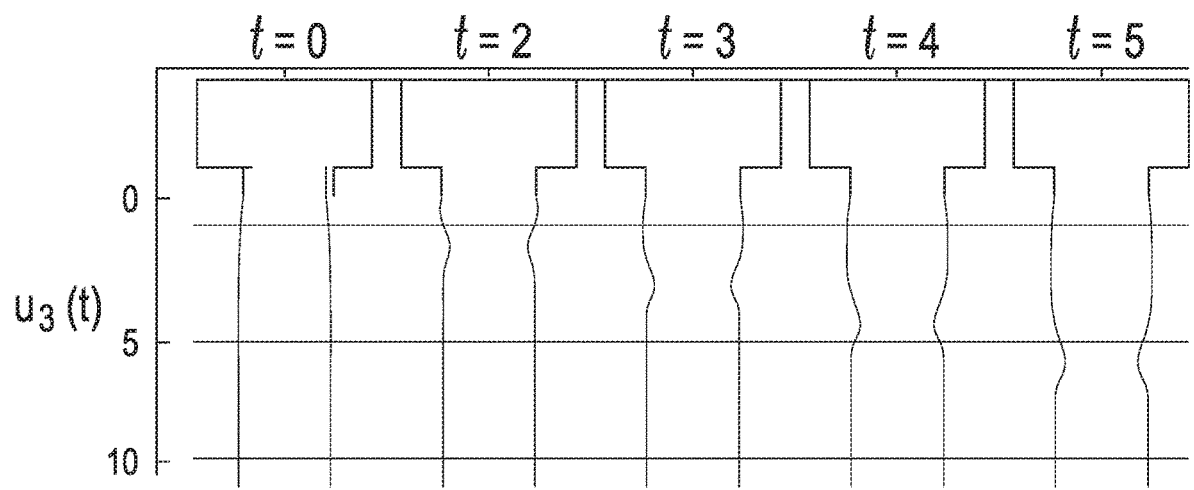

FIGS. 7A-7C show the extrudate shapes resulting from the inputs $u_1(t)$, $u_2(t)$, and $u_3(t)$, respectively, at t=0, t=2, t=3, t=4, t=5, for x=0 to x=10. It is assumed that u keeps its initial value for a long period of time before t=0. Therefore, the steady state extrudate shape is shown at t=0. Die swell can be observed where the extrudate thickness values are larger than the die gap. Moreover, the extrudates develop a neck-like shape when the die gap increases suddenly. When the die gap is increased, the thickness decreases before it increases, resulting in a neck-like shape. The opposite is true when the die gap is decreased, resulting in a bulge on the extrudate. Bulging and necking phenomena are mainly due to the change in volumetric flow rate at the die exit. Even though the volumetric flow rate is constant at the inlet, the volumetric flow rate changes at the die exit due to the change of volume between the die gaps. In FIGS. 7A-7C, the neck shape travels downward fastest for $u_1(t)$ in FIG. 7A and slowest for $u_3(t)$ in FIG. 7C because the material velocity is higher for smaller die gaps. FIG. 7B shows an intermediate material velocity.

Figure 8:
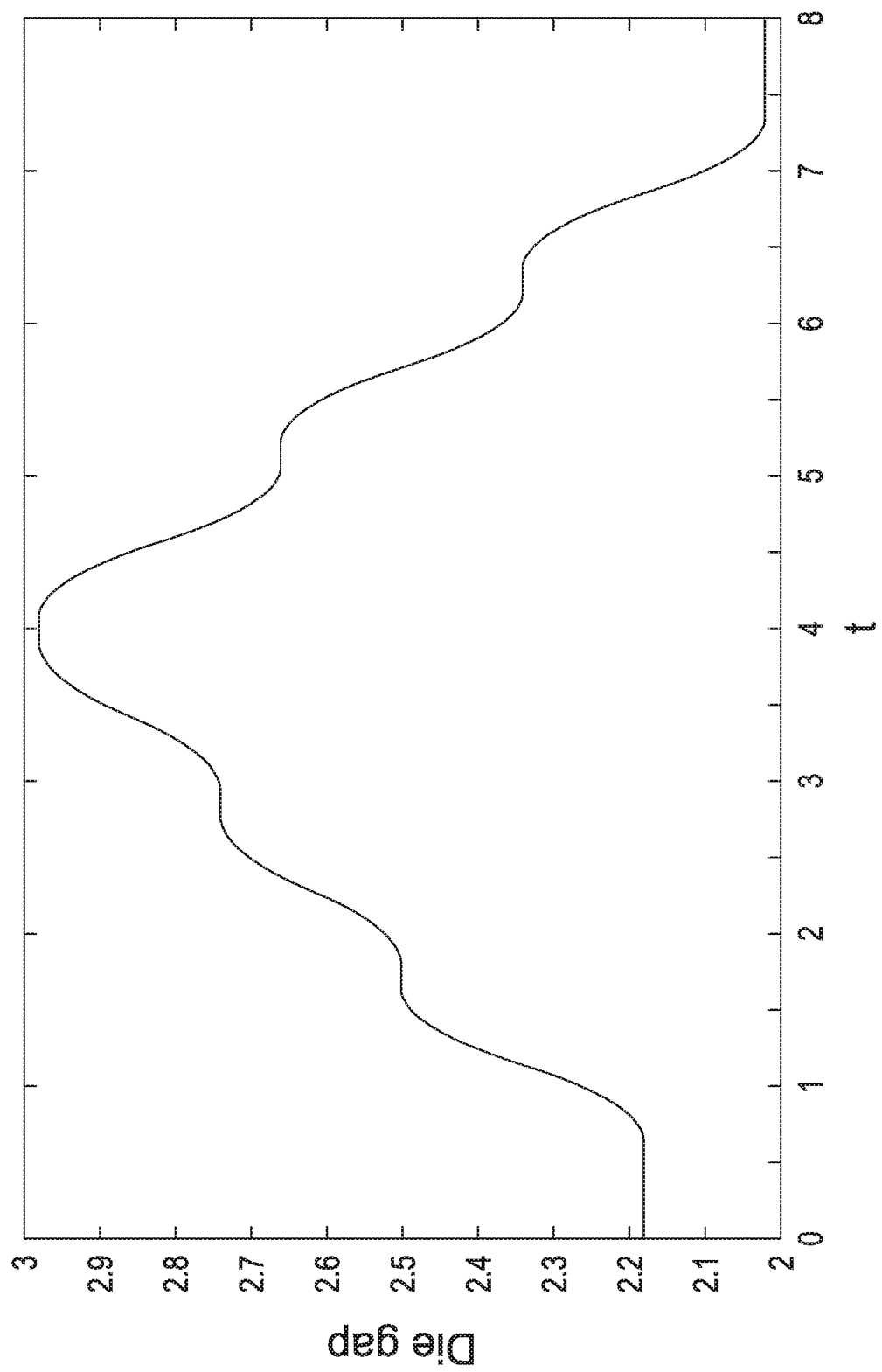
FIG. 8 illustrates an example variation of the die opening with respect to time for a given set of set points, in accordance with some embodiments.
Figure 9:
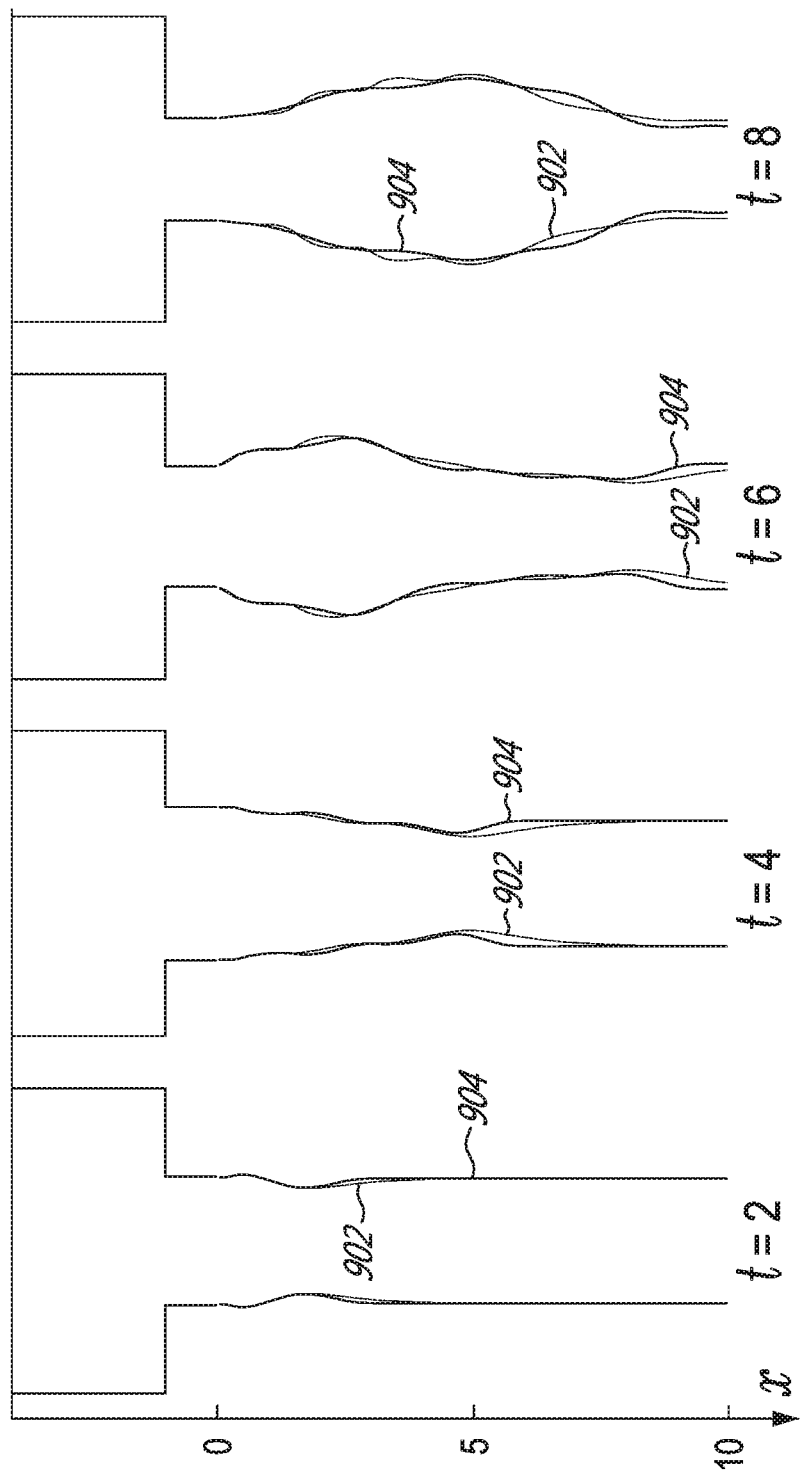
FIG. 9 illustrates an example extrudate shape based on the die gap of FIG. 8 over time, in accordance with some embodiments.

Die gap programming is used to tune the set points in order to control the extrudate thickness and the final product in EBM. For example, extrusion time may be divided into a plurality of equal intervals in which the die gap is set to a constant value. Generally, most of the stretching during molding occurs in the middle of the extrudate. Therefore, the middle of the extrudate is chosen to be thicker. On the other hand, the molds clamp at the top and the bottom of the extrudate, thus, the top and bottom are chosen to be thinner. FIG. 8 shows an example of die gap versus time for one complete cycle. FIG. 9 shows the extrudate shapes as simulated by the computer model at 904 and the reference model at 902 using the inputs shown in FIG. 8.

Figure 10A:
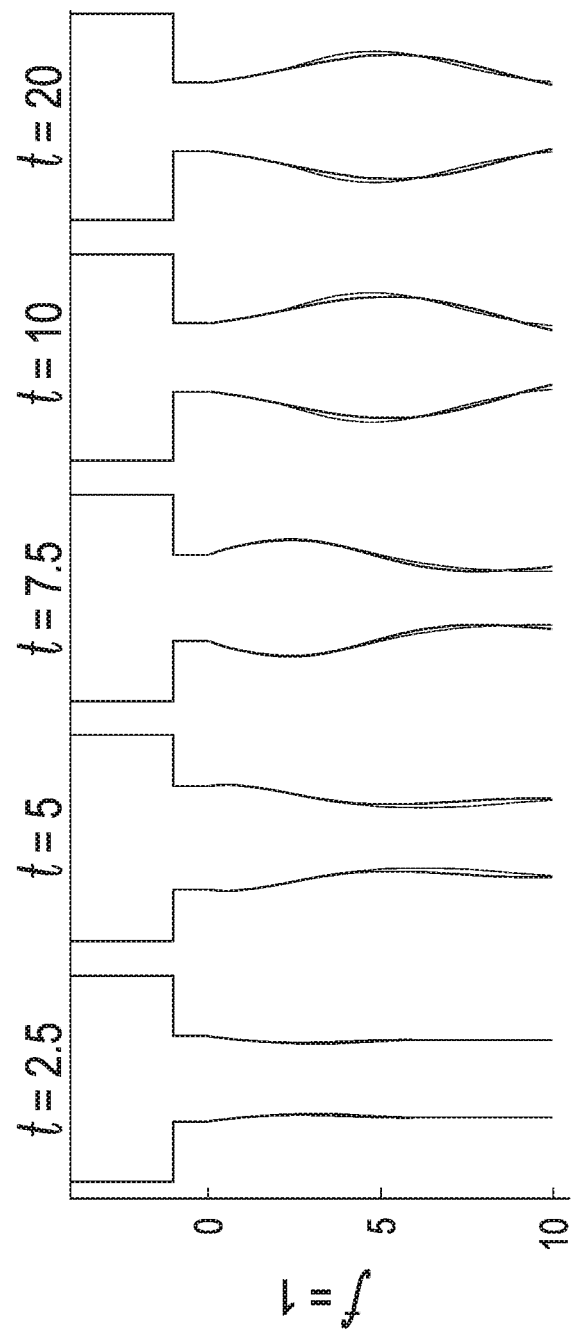
FIGS. 10A-10D illustrates example extrudate shapes based on different sinusoidal inputs, in accordance with some embodiments.
Figure 10B:
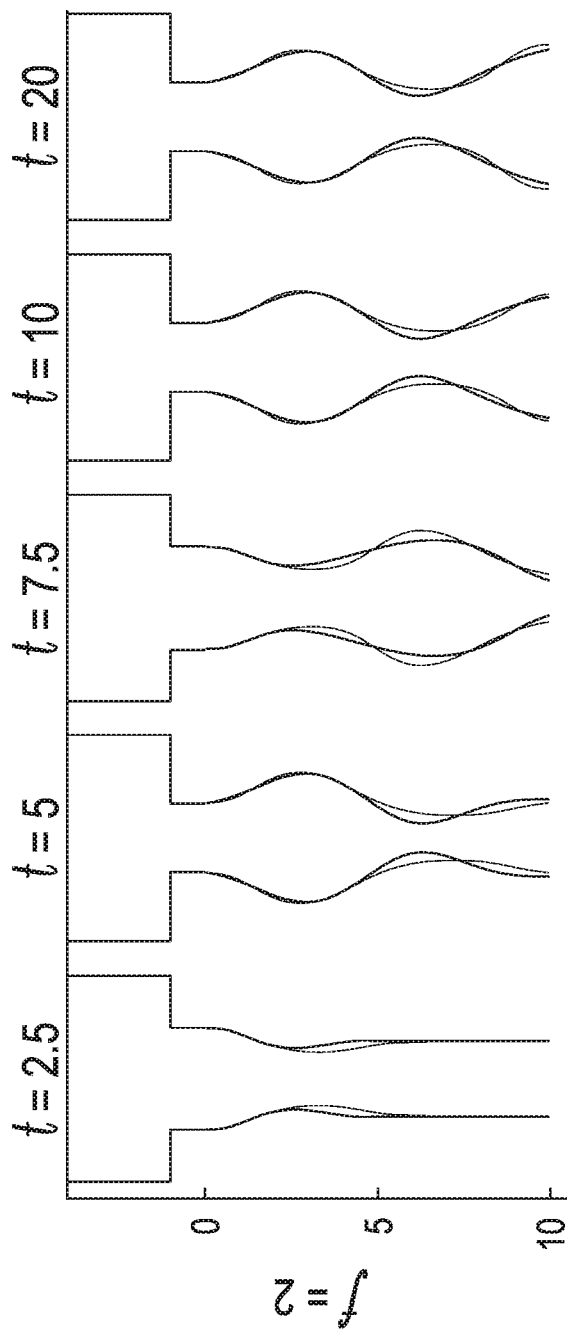
Figure 10C:
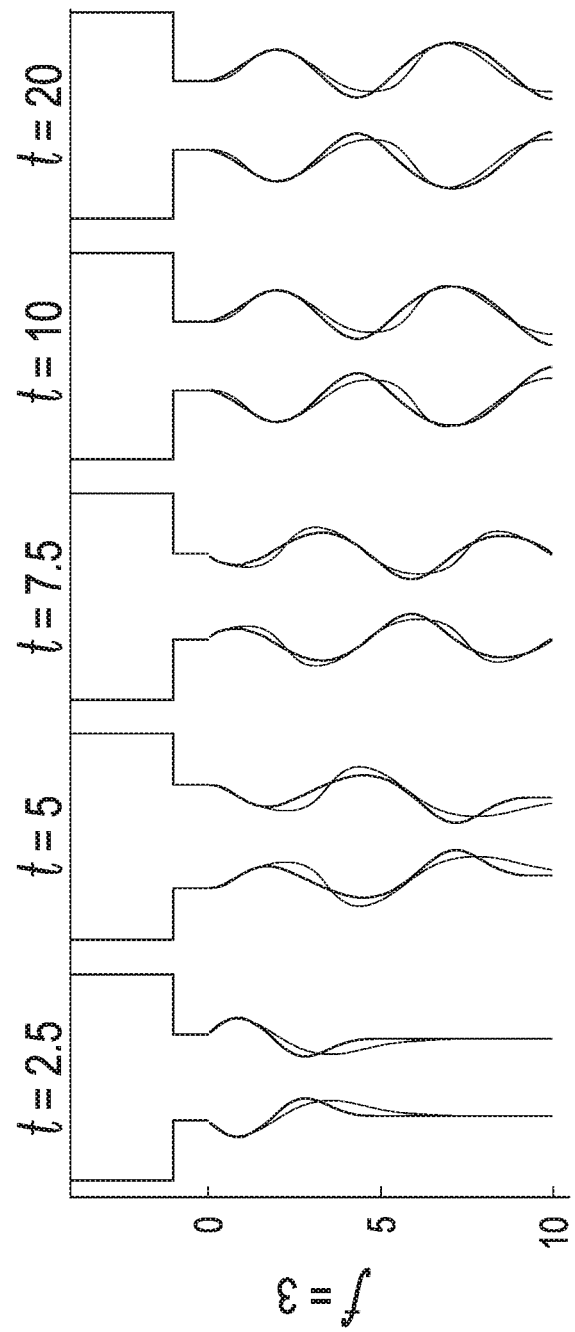
Figure 10D:
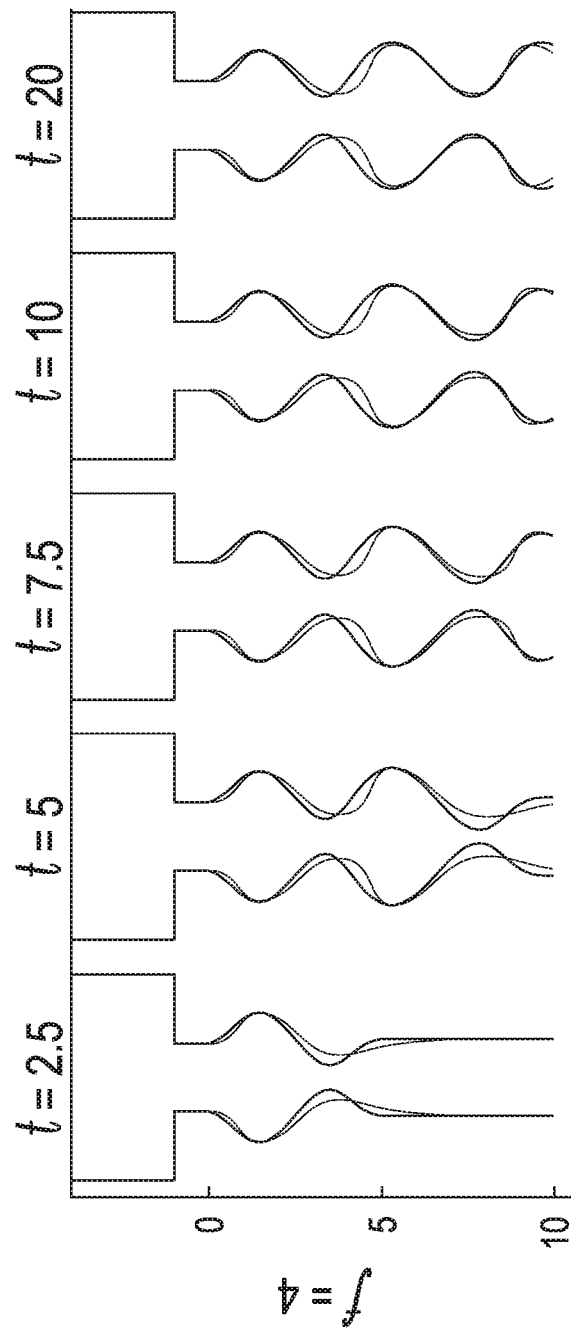

FIGS. 10A-10D illustrate various simulations performed using sinusoidal inputs with different frequencies. The signals are centered at u=2.5 and have an amplitude of 0.5 so that the signal varies from 2 to 3. The frequencies used are f=1 (FIG. 10A), f=2 (FIG. 10B), f=3 (FIG. 10C), and f=4 (FIG. 10D). The extrudate thickness as simulated by the computer model is overlaid with a simulation using the reference model. FIGS. 9 and 10A-10D show that the computer model as described herein is capable of reproducing the results of much more complex simulation models. However, the simplicity of the model allows the simulation to be run on a real time computing system subject to specific time constraints, as is the case for EBM.

Figure 11:
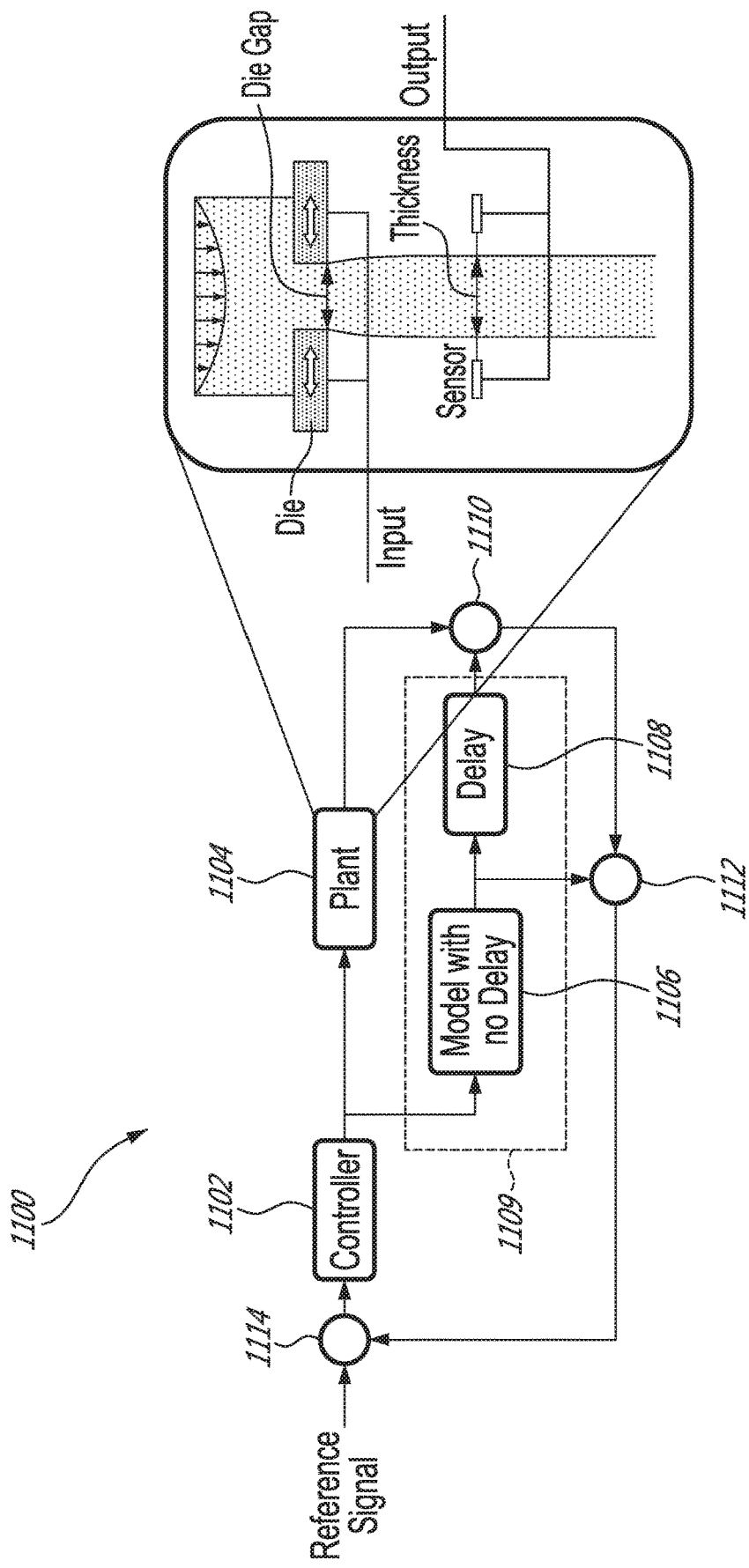
FIG. 11 is a block diagram of a controller, in accordance with some embodiments.

Referring to FIG. 11, the computer model is incorporated into a feedback system 1100 that prevents EBM from being subject to machine drift. A thickness sensor is placed at a location below the die, as shown for example in the diagram of the plant 1104. The plant may be represented physically in a physical environment or virtually in a virtual environment. In the virtual environment, the thickness sensor is provided virtually. Thickness drifts are picked up by the sensor and compensated for by a controller 1102. The controller 1102 automatically changes the die gap to minimize the variations. The system 1100 is designed to ensure a stable closed loop system and to compensate for the added disturbance.

More generally, the system 1100 is configured for regulating the extrusion process as performed by the plant 1104. Measurements of the sensor indicative of material thickness at the point away from the die are received and compared to an expected thickness of the material for a given die gap at the point. The expected thickness is modeled in real-time using the die gap as input. The comparison of the received measurements and the expected thickness yields an error. When the error exceeds a threshold, the die gap is modified to compensate for the error.

In some embodiments, the sensor moves along the extrudate as it is being extruded, recording its thickness at various instants and locations. One or more sensor may be provided in a fixed or moving configuration.

In some embodiments, an $H_\infty$ optimal controller in a Smith predictor configuration is used as the computer model 1109 to model the expected thickness of the material. The plant 1104 is represented by $G(s)$, which may be split into two parts, a Hammerstein model ($H(s)$) and a time delay term ($e^{-\theta s}$):

$$G(s) \cong H(s)e^{-\theta s}$$

Using the Smith predictor configuration, the computer model 1109 is designed with $H(s)$ as block 1106 and the delay as block 1108. A first comparator 1110 compares the outputs of the plant 1104 (i.e. the sensed thickness) with the output of the computer model 1109. A second comparator 1112 compares the result of the first comparator 1110 with the output of the model without delay 1106. The result of the second comparator 1112 is sent to a third comparator 1114 and compared with a reference signal. The reference signal corresponds to the initial die gap parameters, or set points, for the product being produced. The result of the third comparator 1114 is sent to the controller 1102, where an adjustment to the die gap setting is made as a function of the actual thickness being produced by the EBM process. Any known control technique may be used by the controller 1102 to adjust the die gap when needed.

In some embodiments, a method for regulating the extrusion process is performed continuously during the extrusion process. A real-time simulation of the extrusion process may be performed using an input-dependent, time-varying delay model, as described herein. In some embodiments, the model has a transport partial differential equation/nonlinear ordinary differential equation cascade structure.

To show the effectiveness of the feedback system 1100, an artificial disturbance is added to the plant 1104 as a constant value of 0.2 to the input. Moreover, different positions for the output sensor are considered to study the effect of the position of the sensor on the regulation. Different systems are designed for the different locations of the sensor given that the dynamics of the system change if the position of the sensor is changed. FIGS. 12A-12F show how the system 1100 compensates for the input disturbance if the sensor is placed at x=0.125 (FIG. 12A), 0.5 (FIG. 12B), 1 (FIG. 12C), 1.5 (FIG. 12D), 2 (FIG. 12E) or 2.5 (FIG. 12F). The input of FIG. 8 is used to test the system 1100. The dotted line 1200 shows the measurement read by the sensor if there was no disturbance. This signal is the desired measurement and is set as the reference signal in FIG. 11. The measurement of the system if a disturbance is added without compensation is shown at 1202. The thickness at the sensor when disturbance is present at the input and the feedback system is used is shown at 1204. It can be observed that the controlled thickness at the sensor is closer to the desired thickness.

Figure 13A:
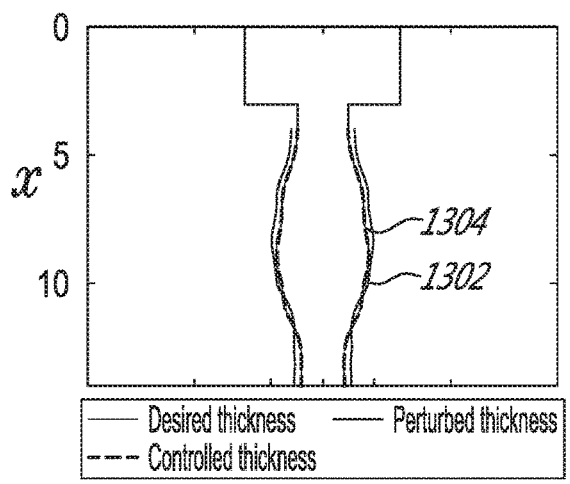
FIGS. 13A-13F illustrate example extrudate shapes in various settings, in accordance with some embodiments.
Figure 13B:
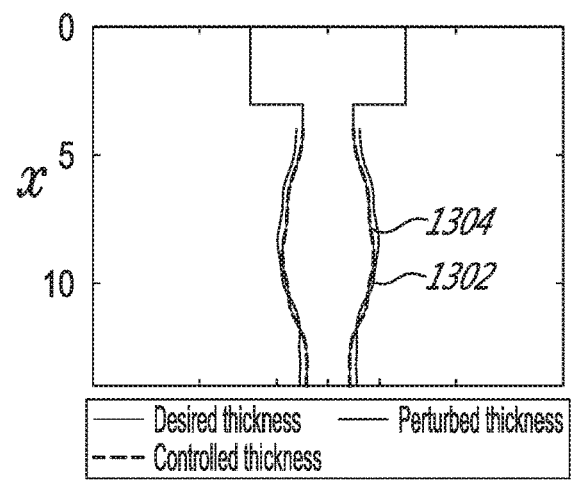
Figure 13C:
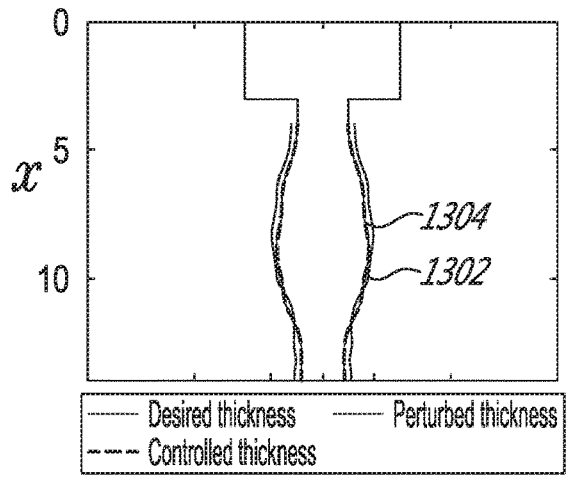
Figure 13D:
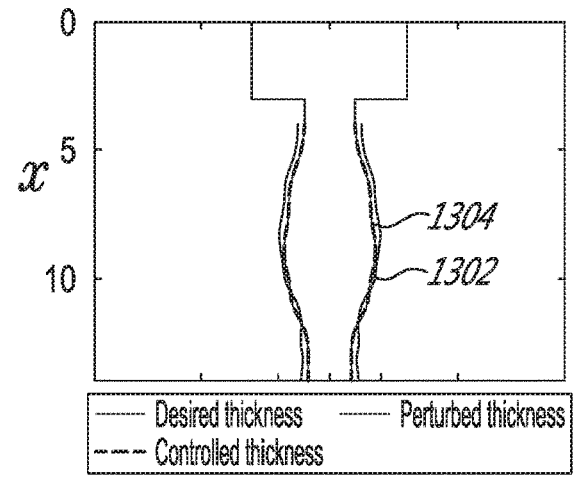
Figure 13E:
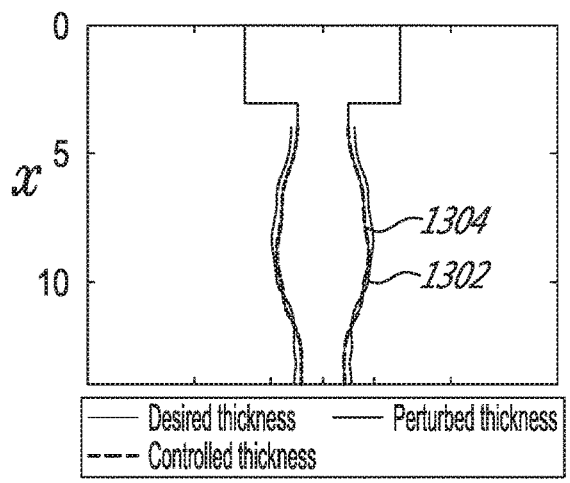
Figure 13F:
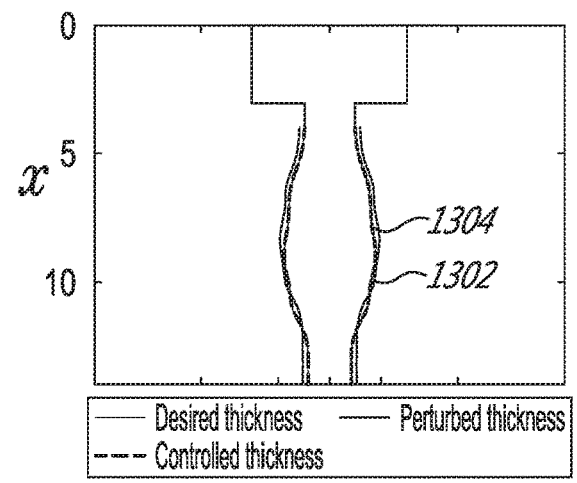

Even though, the system maintains the thickness at one point, the overall thickness at the end of the cycle is also maintained, as shown in FIGS. 13A-13F. Moreover, FIGS. 13A-13F show the overall extrudate shapes when the sensor is placed at x=0.125 (FIG. 13A); 0.5 (FIG. 13B); 1 (FIG. 13C); 1.5 (FIG. 13D); 2 (FIG. 13E) and 2.5 (FIG. 13F). The controlled extrudate in presence of a disturbance is shown at 1302, and the uncontrolled profile with added disturbance is shown at 1304.

Figure 14:
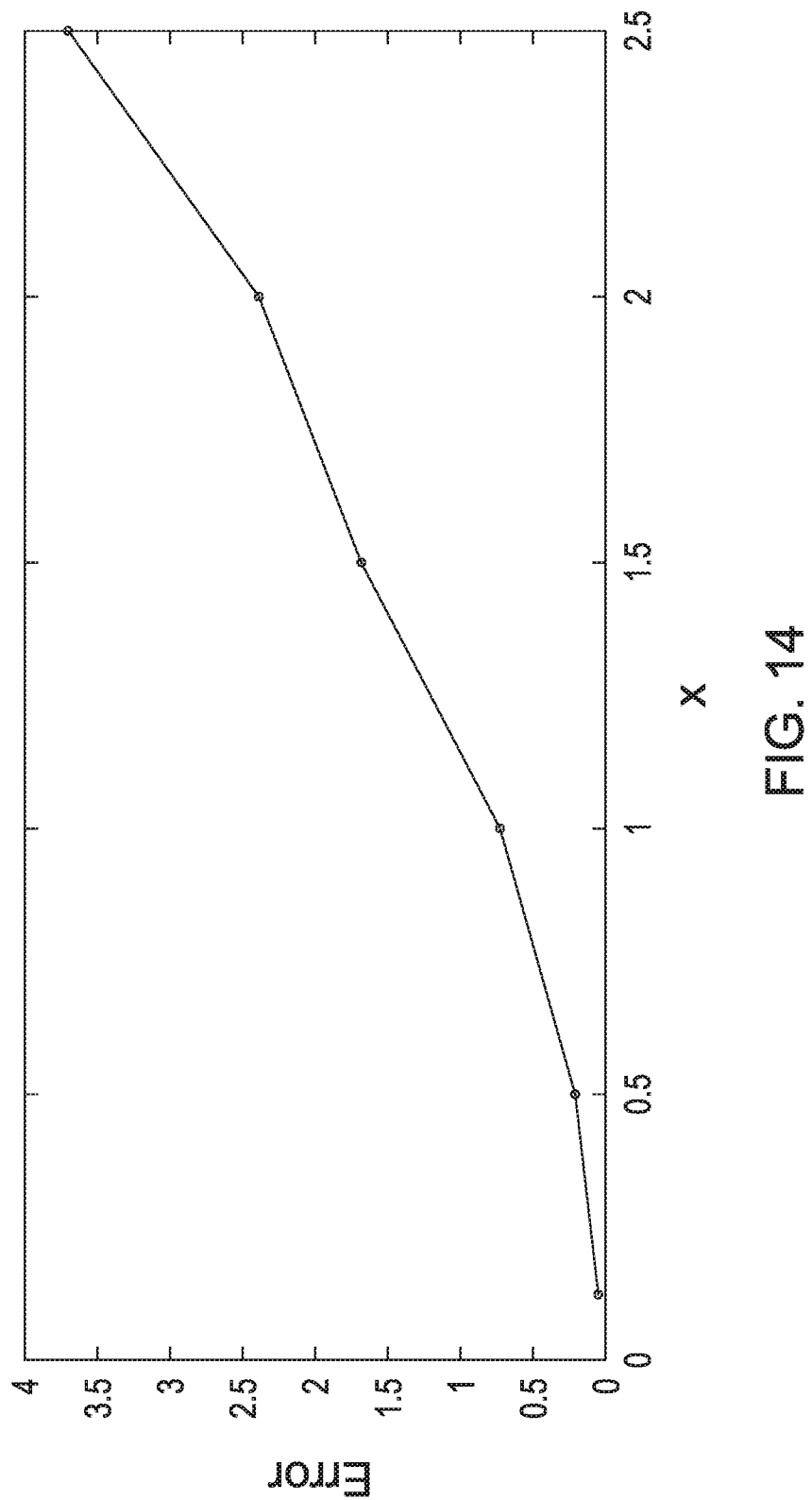
FIG. 14 illustrates the effects of sensor location on errors due to the disturbance in the presence of a controller, in accordance with some embodiments.

FIG. 14 shows the effect of the location of the sensor with respect to the die on the error between the desired overall extrudate thickness and the overall controlled extrudate thickness. The error is the absolute summation of the difference between the desired extrudate thickness and the controlled extrudate thickness. It can be observed that the performance improves with the feedback system and the error decreases as the sensor is placed closer to the die. When the sensor is placed closer to the die, the material travels for shorter distances. Thus, the plant exhibits smaller delays. The decrease in error with the decrease of the distance between the die and the sensor may be true for input disturbances but cannot be generalized for other disturbance types. For example in the case of temperature changes, larger machine drift values may be measured when the sensor is placed further away from the die. In general, the extrudate thickness tends to be equal to the die gap for shorter distances from the die, making it harder to measure machine drifts. Moreover, other factors such as the accuracy of the sensors may affect the optimal location of the sensor. In addition, other practical constraints such as sensor-mold clearance and high temperatures may be taken into consideration before choosing the location of the sensor.

Figure 15:
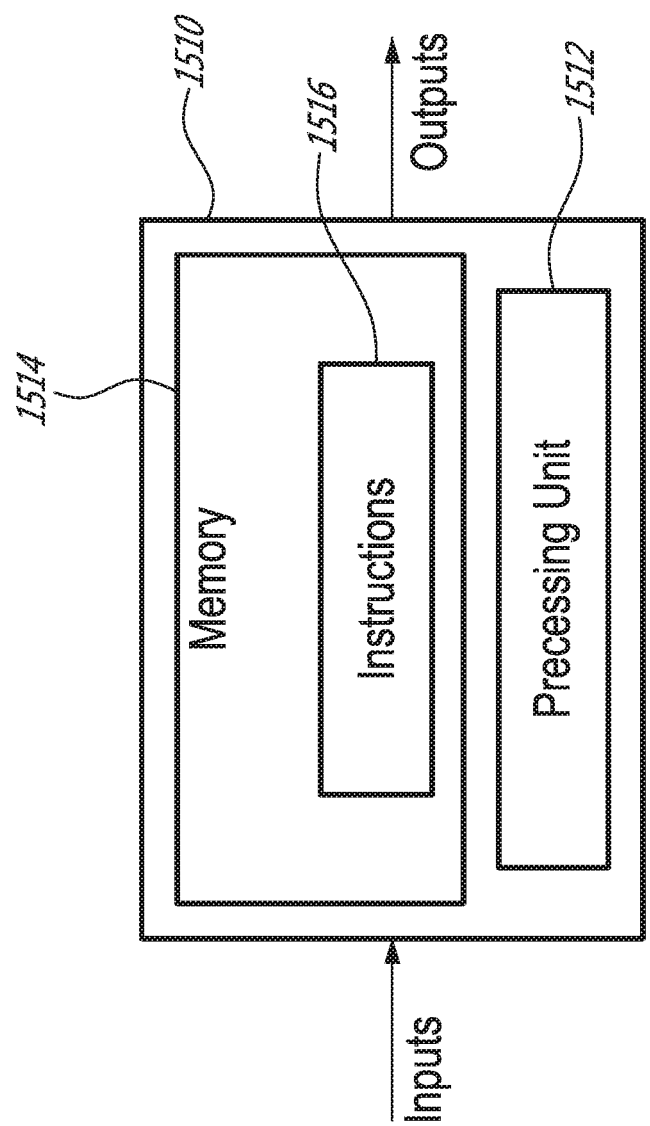
FIG. 15 is a block diagram of an example computing device, in accordance with some embodiments.

With reference to FIG. 15, an example of a computing device 1510 is illustrated. The feedback system 1100 may be implemented with one or more computing devices 1510. For example, each of the controller 1102 and the computer model 1109 may be implemented by a separate computing device 1510 to perform the functions of the feedback system 1100. In some embodiments, the computing device 1510 provides all of the extrudate thickness prediction aspects and gap size control aspects as described herein. In some embodiments, the extrusion process may be provided virtually on the same computing device 1510 or on a separate computing device. In some embodiments, a first set of program instructions are used to implement the extrusion process and a second set of program instructions are used to implement the regulation of the extrusion process, with both sets of program instructions executable by the same or different processing unit. Various embodiments may apply as a function of practical implementation.

The computing device 1510 comprises a processing unit 1512 and a memory 1514 which has stored therein computer-executable instructions 1516. The processing unit 1512 may comprise any suitable devices configured to implement the methods described herein such that instructions 1516, when executed by the computing device 1510 or other programmable apparatus, may cause the functions/acts/steps performed as part of the methods described herein to be executed. The processing unit 1512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 1514 may comprise any suitable known or other machine-readable storage medium. The memory 1514 may comprise non-transitory computer readable storage medium, for example, but not limited to, an electronic, magnetic, optical, electromagnetic, infrared, or semiconductor system, apparatus, or device, or any suitable combination of the foregoing. The memory 1514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1514 may comprise any storage means (e.g., devices) suitable for retrievably storing machine-readable instructions 1516 executable by processing unit 1512.

The methods and systems described herein may be implemented in a high level procedural or object oriented programming or scripting language, or a combination thereof, to communicate with or assist in the operation of a computer system, for example the computing device 1510. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 1512 of the computing device 1510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the disclosure. Still other modifications which fall within the scope of the disclosure will be apparent to those skilled in the art, in light of a review of this disclosure.

Various aspects of the methods and systems may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this disclosure in its broader aspects. The scope of the following claims should not be limited by the embodiments set forth in the examples, but should be given the broadest reasonable interpretation consistent with the description as a whole.

The invention claimed is:

1. A method for regulating an extrusion process, the method comprising:
    continuously and in real-time, during a current extrusion cycle,
    obtaining a first thickness at a first position along an extrudate as material is extruded through a die gap of a die;
    comparing the first thickness with an expected thickness of the extrudate at the first position to obtain a value for an error, the expected thickness modeled in real-time using a size of the die gap as input and by applying a linear system with non-minimum phase dynamics and a unity DC gain; and
    varying the size of the die gap used in the current extrusion cycle when the error exceeds a threshold to compensate for the error.

2. The method of claim 1, wherein the extrusion process is virtual.

3. The method of claim 1, wherein the expected thickness is modeled using an input-dependent time-varying delay model.

4. The method of claim 1, wherein the expected thickness is modeled with a computer model comprising a first component that models a material transport delay from the die gap to the first position, a second component that determines a steady state thickness of the extrudate at the first position taking into account the material transport delay, and a third component that replicates a change of the steady state thickness with respect to time to output the expected thickness at the first position.

5. The method of claim 4, wherein the second component comprises the linear system with non-minimum phase dynamics and the unity DC gain.

6. The method of claim 1, wherein the expected thickness is modeled with a Hammerstein model with delay.

7. The method of claim 1, wherein the expected thickness is modeled using a transport partial differential equation and non-linear ordinary differential equation cascade structure.

8. The method of claim 1, wherein the expected thickness is modeled using an $H_\infty$ optimal controller in a Smith predictor configuration.

9. The method of claim 1, further comprising obtaining at least one second thickness at a second position of the extrudate, and comparing the second thickness to the expected thickness of the extrudate at the second position to obtain a second value for the error.

10. The method of claim 9, wherein obtaining the at least one second thickness at the second position of the extrudate comprises displacing a sensor along the extrudate.

11. A method for determining an expected thickness of a material during an extrusion process, the method comprising:
    in real-time during the extrusion process,
    obtaining a size of a die gap at a time T and a first position away from the die gap along an extrudate as material is extruded through the die gap;
    modeling a material transport delay from the die gap to the first position for the size of the die gap;
    determining a steady state thickness of the extrudate at the first position taking into account the material transport delay;
    replicating a change in the steady state thickness with respect to time to determine the expected thickness at the first position at time T, wherein determining the steady state thickness and replicating the change in the steady state thickness comprises applying the material transport delay model and a linear system with non-minimum phase dynamics and a unity DC gain;
    outputting the expected thickness of the material; and
    applying the expected thickness of the material in a feedback system for preventing machine drift during the extrusion process.

12. The method of claim 11, wherein replicating the change in the steady state thickness comprises applying a linear system with memory.

13. The method of claim 11, wherein determining the steady state thickness and replicating the change in the steady state thickness comprises applying a Hammerstein model.

14. The method of claim 13, wherein the Hammerstein model is applied as a non-linear Ordinary Differential Equation.

15. The method of claim 14, wherein modeling the material transport delay comprises solving a transport Partial Differential Equation.

16. The method of claim 11, wherein modeling the material transport delay, determining the steady state thickness and replicating the change in the steady state thickness comprises using an $H_\infty$ optimal controller in a Smith predictor configuration.

17. The method of claim 11, wherein the extrusion process is performed in a virtual environment.

18. A system for determining an expected thickness of a material during an extrusion process, the system comprising:
    a processing unit; and
    a non-transitory computer-readable medium having stored thereon program code executable by the processing unit for:
        in real-time during the extrusion process,
        obtaining a size of a die gap at a time T and a first position away from the die gap along an extrudate as material is extruded through the die gap;
        modeling a material transport delay from the die gap to the first position for the size of the die gap;
        determining a steady state thickness of the extrudate at the first position taking into account the material transport delay;
        replicating a change in the steady state thickness with respect to time to determine the expected thickness at the first position at time T, wherein determining the steady state thickness and replicating the change in the steady state thickness comprises applying the material transport delay model and a linear system with non-minimum phase dynamics and a unity DC gain;
        outputting the expected thickness of the material; and
        applying the expected thickness of the material in a feedback system for preventing machine drift during the extrusion process.

* * * * *